Feb. 11, 1969  C. L. HINKSON  3,426,468
SWIVEL HANGER FOR FISHING LURE
Filed Jan. 20, 1967  Sheet 2 of 2
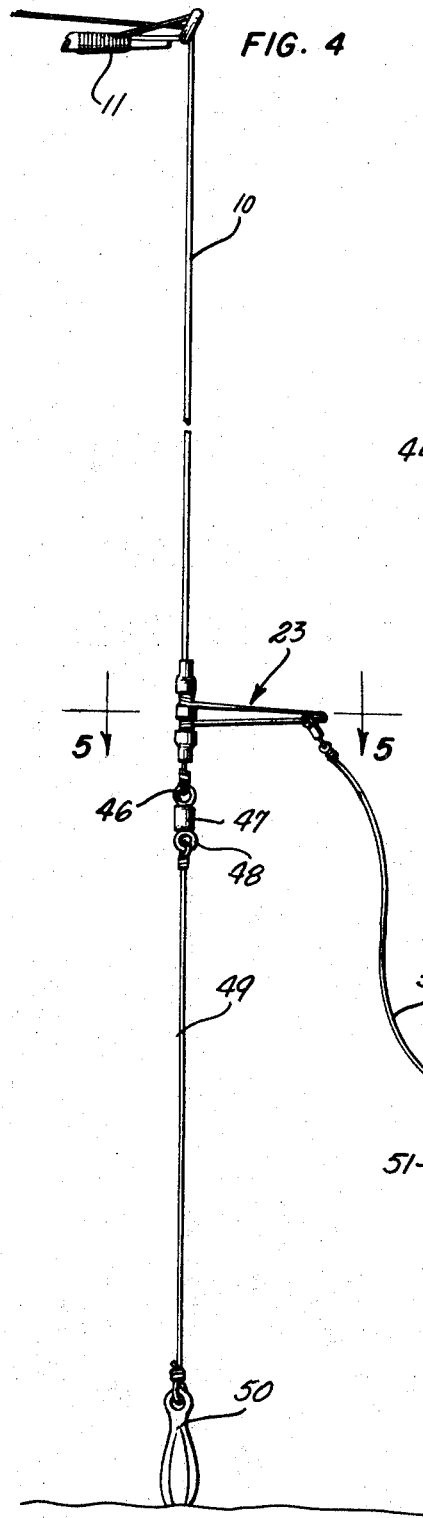
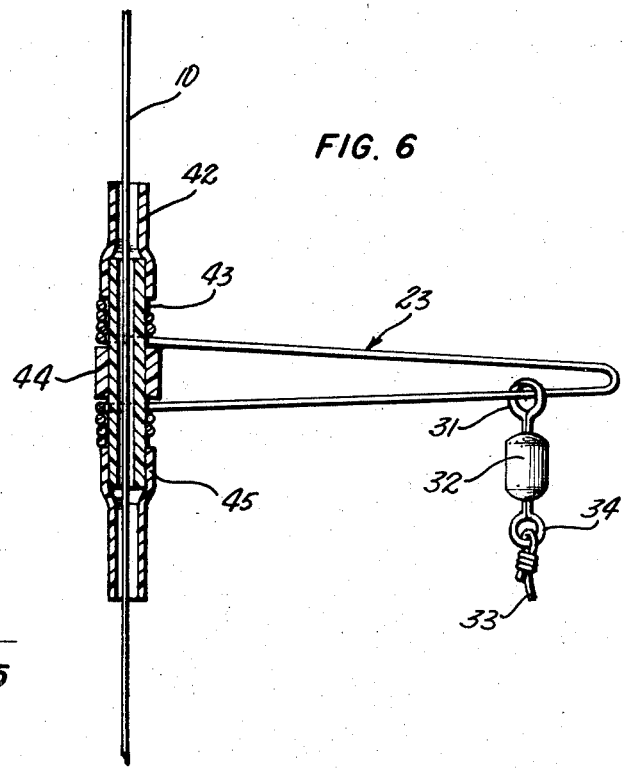
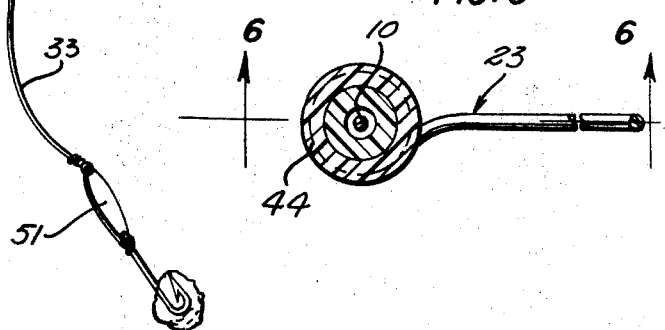
INVENTOR
*Clair L. Hinkson*

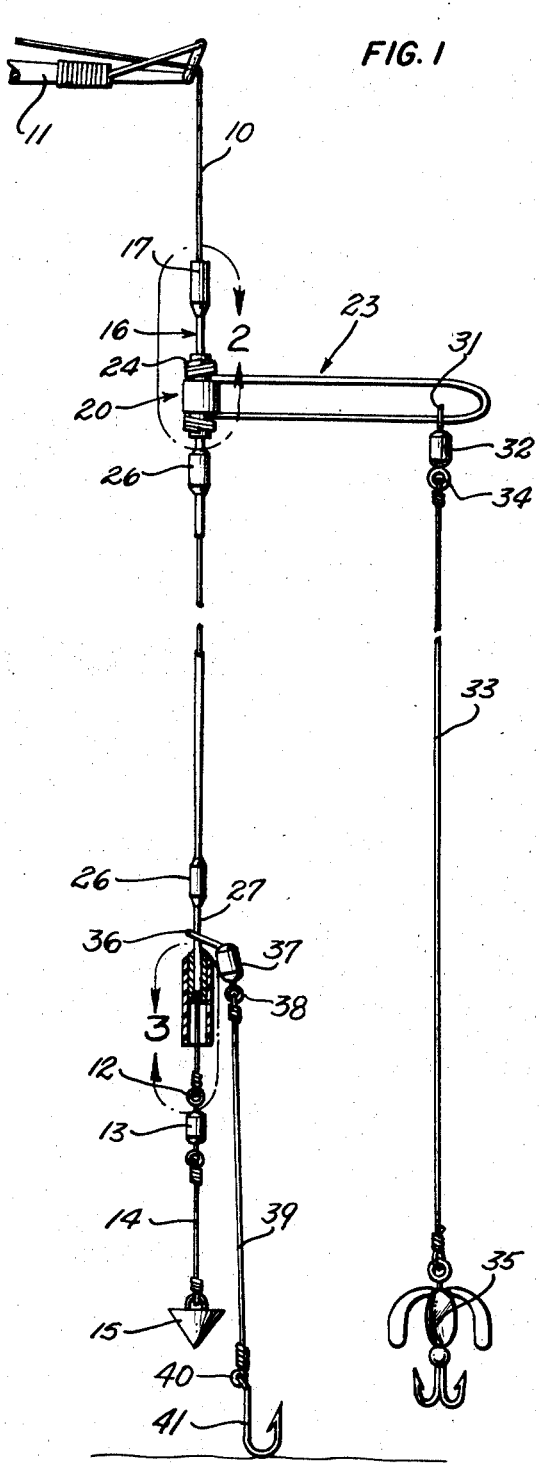
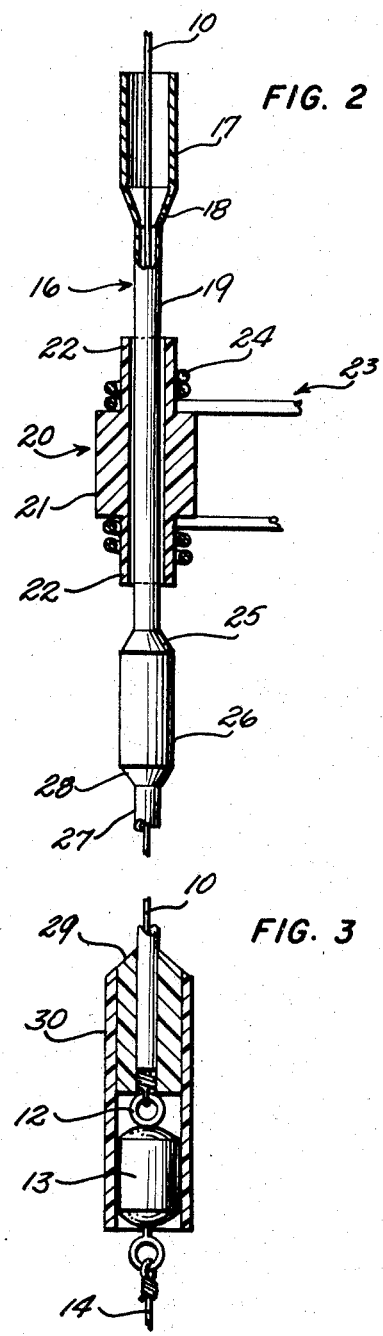

United States Patent Office 3,426,468
Patented Feb. 11, 1969

3,426,468
SWIVEL HANGER FOR FISHING LURE
Clair L. Hinkson, R.R. 5, Box 389C,
Olympia, Wash. 98501
Filed Jan. 20, 1967, Ser. No. 610,590
U.S. Cl. 43—42.74     5 Claims
Int. Cl. A01k 91/04, 95/00

ABSTRACT OF THE DISCLOSURE

A swivel hanger for a fishing lure includes an elongated first tubular member slidable on a fishing line and has a second tubular member rotatable and slidable thereon. A swivel arm on the second tubular member loosely receives a leader provided with a fishing lure on its outer end. A sinker line is swivel connected to the outer end of the fishing line and tubular friction means at the lower end of the first tubular member releasably secures the first tubular member to said fishing line through the swivel.

PURPOSES

The principal object of this invention is to provide a swivel hanger for fishing lure that will prevent the line from twisting and tangling, particularly when the line is wound around one of the so-called modern spinning reels.

Another object of this invention is to provide a swivel hanger for fishing lure that will, when a fish has been hooked, pull the swivel hanger free from its rigid connection with the sinker, thereby freeing the swivel fishing lure hanger so that it will slide free up and down on the fishing line.

Another object of this invention is to provide a swivel hanger for fishing lure that will prevent a hooked fish from fighting a snagged sinker when one is fishing in a stream whose bottom is covered with rocks, boulders, and the like.

Still another object of this invention is to provide a swivel hanger for fishing lure that will prevent its leaders from tangling when one is surf fishing from a beach.

Other and further objects and advantages of this invention will no doubt come to mind as the reading of this specification proceeds and the appended drawings are examined.

DRAWINGS

In the drawings:

FIG. 1 is a side view of this invention, secured to a fishing line having a sinker on the lower end thereof.

FIG. 2 is an enlarged sectional view of that portion of this invention that is enclosed within the arrowed ellipse and indicated by the numeral 2 in FIGURE 1.

FIG. 3 is an enlarged sectional view of that portion of this invention that is enclosed within the arrowed ellipse and indicated by the numeral 3 in FIGURE 1.

FIG. 4 is a view of this invention somewhat similar to FIGURE 1 but with the only one leader and hook secured to the fishing line and with a different type of sinker being secured to the lower end of the same fishing line.

FIG. 5 is a partial sectional view of this invention, taken substantially along line 5—5 of FIGURE 4, and looking in the direction indicated by the arrows.

FIG. 6 is a partial sectional view of this invention, taken substantially along line 6—6 of FIGURE 5, and looking in the direction indicated by the arrows.

In the drawings, like parts are indicated by like reference numbers throughout the several views.

The reference number 10 indicates a fishing line that has one end secured to a reel (not shown) that is mounted on the lower end of the fishing rod 11. The other end of the aforesaid fishing line being secured to the upper end 12 of the barrel type swivel 13 that has its lower end secured to the upper end of the line 14, which is of lower test than line 10, which line 14 has its lower end secured to the sinker 15, as is clearly shown in FIGURE 1 of the drawings.

The aforesaid line 10 passes through a hollow nylon tubular member 16 that has an enlarged open upper end 17 whose lower end tapers down at 18 to the tube 19 which passes slidably through the hollow nylon tubular member 20. The just mentioned tubular member 20 has an enlarged centrally located body 21 and an integrally formed tube 22 of smaller diameter than that of the said body 21 projecting outward from each end of the said body, as one can best see and understand when looking at FIGURE 2 of the drawings. A wire swivel 23 extends outward at right angle from the aforesaid tubular member 20. The preferred form of wire swivel 23 comprises a horizontally disposed, U-shaped arm member formed of wire as shown in FIG. 1. One end 24 of the wire swivel arm 23 is wound around the upper one of the aforesaid tubes 22 while the other end of the same piece of wire is likewise wound around the lower one of the aforesaid tubes 22, as is clearly shown in FIGURE 2 of the drawing. Here it is also seen that the lower end of the already mentioned tube 19 expands at 25 into the enlarged intermediate member 26 of the aforesaid tubular member 16. A tube 27 has its upper end integrally formed at 28 while the lower end of the same tube extends downward into the center of the tube 29 to which it is suitably cemented. Tube 29 is fitted into the tube 30 to which tube 29 is likewise suitably cemented, after being fitted into the same, as one can see by examining FIGURE 3 of the drawings. When barrel swivel 13 is in the lower end of tube 30, the swivel 13 and tube 30 fit closely enough to form a rigid connection that will keep the structure at the free end of the line together while casting but will be pulled apart when a fish which often weighs 30 pounds, takes the bait. It is clearly seen here that the lowermost end of the aforesaid fishing line 10, which slidably runs through the center of all of the above described parts of this invention, is suitably secured to the aforesaid upper end 12 of the barrel swivel 13, as has been previously stated.

Looking now at the right hand portion of FIGURE 1, it will be seen that the eye 31 of the barrel type swivel 32 has the lower portion of the aforesaid wire swivel 23 passing through the eye 31, while the upper end of the leader 33 is suitably secured to the lower eye 34 of the aforesaid swivel 32. Any desired type of fishing lure 35 is suitably secured to the lower end of the aforesaid leader 33, as can readily be seen by looking at FIGURE 1 of the drawings.

Continuing to look at FIGURE 1, it will be seen that the aforesaid tube 27 of this invention slidably passes through the eye 36 of the swivel 37 whose lower eye 38 provides a place of attachment for the upper end of the leader 39 whose lower end is secured to the eye 40 of the fishing hook 41.

In the modified form of this invention shown in FIGURES 4, 5, and 6, the aforesaid fishing line 10 slidably passes down through the center of the nylon tube 42 that has it lower end cemented to the upper end of the nylon tube 43 which passes down through the center of the enlarged tube 44 to terminate in being cemented to the nylon tube 45, as one can best see and understand by looking at FIGURE 4 of the drawings. In the modified form of this invention, the lower end of the fishing line 10 terminates in securement to the eye 46 of the barrel type swivel 47 which has its lower eye 48 providing a place of securement for the upper end of line 49 whose lower end is attached to the fishing sinker 50. In this modified form of the invention the lower end of leader 33 is secured to a different type of lure 51.

From the foregoing it will be seen that I have herein provided a swivel hanger for fishing lure that fulfills all of the aforesaid objects of this invention as herein described in detail.

MODE OF USE

No attempt is made to give a detailed explanation of all of the ways in which the detailed parts of this invention function as this is obvious to those having even an elementary knowledge of fishing tackle and its use. An invention of this type is self-explanatory to fishermen who read this specification and the appended claims and who examine the appended drawing.

However, the following brief description of the use is given. In using the modification of FIGURES 1, 2, and 3, barrel type swivel 13 is pulled into the lower end of tube 30 and the structure at the free end of the line cast as a unit, giving better control. When a fish takes the bait, swivel 13 is pulled out of tube 30 permitting the tubular members to slide along the line and also causing the fish to fight the end of the pole rather than to fight the sinker. In case sinker 15 has become snagged in rocks or other snags at the bottom of the stream, line 14 will be broken before line 10, to free the line.

The modification of FIGURES 4, 5, and 6 is used in fishing in deep water from a boat, in locations where there are large swells.

In use of this modification, the end of the line with its sinker, tubular members, and bait are lowered into the water. As the boat rises and falls with the swells, line 10 slides through tubular members 42, 43, and 45 and the bait is not jerked up and down each time the boat rises or falls.

What I now claim as new and desire to secure by Letters Patent is:

1. A swivel hanger for a fishing lure, comprising:
a fishing line;
a first tubular member slidably placed on said fishing line;
a second tubular member rotatably slidable on said first tubular member;
a wire swivel arm supported on said second tubular member;
a leader loosely secured to said swivel arm;
said leader having a fishing lure on the outer end thereof;
a sinker line connected by a barrel swivel to the outer end of said fishing line and having a sinker thereon; and
said first tubular member having a tube on its lower end to receive and closely fit said barrel swivel for releasably securing said first tubular member and said sinker line together.

2. The structure of claim 1 in which a second leader has a swivel and is slidably secured to said first tubular member by means of said swivel and is located below said wire swivel arm.

3. The structure of claim 1 in which the wire swivel arm includes a horizontally disposed U-shaped member having each end wound around said second tubular member.

4. The structure of claim 1 in which the first tubular member has intermediate its ends and below the wire swivel arm an enlarged member that limits downward movement of said wire swivel arm.

5. The structure according to claim 3 in which the second tubular member comprises an enlarged central portion having integrally formed tubular ends of smaller diameter than that of the central portion and each end of said U-shaped member is wound around one of said tubular ends of smaller diameter.

References Cited

UNITED STATES PATENTS

| | | | |
|---|---|---|---|
| 473,503 | 4/1892 | Herring | 43—44.85 |
| 1,782,010 | 11/1930 | Meyer | 43—42.74 |
| 2,494,620 | 1/1950 | Johnson | 43—44.9 X |
| 2,545,326 | 3/1951 | Westfall et al. | 43—42.74 |
| 2,733,536 | 2/1956 | Terazono | 43—42.74 |
| 1,840,762 | 1/1932 | Akervick. | |
| 2,444,791 | 7/1948 | Stahnke et al. | 43—44.88 |

FOREIGN PATENTS 1,370,710    7/1964    France.

SAMUEL KOREN, *Primary Examiner.*

JAMES H. CZERWONKY, *Assistant Examiner.*

U.S. Cl. X.R.

43—43.15, 44.85, 44.88, 44.9